(12) United States Patent
Rukavina et al.

(10) Patent No.: US 6,471,360 B2
(45) Date of Patent: Oct. 29, 2002

(54) SWITCHABLE ELECTROCHROMIC DEVICES WITH UNIFORM SWITCHING AND PREFERENTIAL AREA SHADING

(75) Inventors: Thomas G. Rukavina, New Kensington, PA (US); Chia-Cheng Lin, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/919,151

(22) Filed: Jul. 31, 2001

(65) Prior Publication Data

US 2002/0135881 A1 Sep. 26, 2002

Related U.S. Application Data

(60) Provisional application No. 60/222,770, filed on Aug. 3, 2000.

(51) Int. Cl.[7] ............................................. G02B 27/00
(52) U.S. Cl. ..................... 359/609; 359/602; 359/603; 359/604; 359/266
(58) Field of Search ................................. 359/609, 602, 359/603, 604, 266, 265, 267, 269, 271, 452, 272; 252/582, 583; 427/108, 109, 162, 164, 126

(56) References Cited

U.S. PATENT DOCUMENTS

| | | | | |
|---|---|---|---|---|
| 4,233,339 A | * | 11/1980 | Leibowitz et al. | 204/192.26 |
| 4,416,517 A | * | 11/1983 | Beall et al. | 359/270 |
| 5,668,663 A | * | 9/1997 | Varaprasad et al. | 359/265 |
| 6,062,920 A | * | 5/2000 | Jordan et al. | 439/861 |
| 6,064,509 A | * | 5/2000 | Tonar et al. | 359/265 |
| 6,118,573 A | * | 9/2000 | Kubo et al. | 252/511 |
| 6,362,914 B2 | * | 3/2002 | Baumann et al. | 252/583 |
| 6,373,618 B1 | * | 4/2002 | Agrawal et al. | 359/254 |

* cited by examiner

*Primary Examiner*—Mohammad Sikder
(74) *Attorney, Agent, or Firm*—Andrew C. Siminerio

(57) ABSTRACT

An electrochromic window assembly includes: a first transparent substrate having a first conductive coating on a surface thereof; a second transparent substrate having a second conductive coating on a surface thereof, the first transparent substrate and the second transparent substrate being spaced from each other to define a chamber therebetween; an electrochromic medium contained in the chamber, the electrochromic medium having a luminous transmittance that varies upon application of an electrical potential through the electrochromic medium; a plurality of first spaced facilities contacting the first conductive coating and capable of delivering electrical current to the first conductive coating; and a plurality of second spaced facilities contacting the second conductive coating and capable of delivering electrical current to the second conductive coating to establish the electrical potential through the electrochromic medium. The plurality of first spaced facilities and the plurality of second spaced facilities can be bus bars arranged about the perimeter of the window assembly. In addition, the window assembly can include a controller capable of controlling delivery of electrical current to selected ones of the plurality of first spaced facilities and selected ones of the plurality of second spaced facilities, such that the luminous transmittance through a first portion of the electrochromic medium is different from the luminous transmittance through a second portion of the electrochromic medium.

25 Claims, 5 Drawing Sheets

SWITCHABLE ELECTROCHROMIC DEVICES WITH UNIFORM SWITCHING AND PREFERENTIAL AREA SHADING

This application claims the benefit of U.S. Provisional Application No. 60/222,770 filed Aug. 3, 2000.

The present invention relates to switchable electrochromic devices that are capable of uniform switching throughout the entire structure and of preferential switching to selected areas. More particularly, the present invention is directed to switchable electrochromic devices, particularly large scale window transparencies and window transparencies of non-uniform shape, which can uniformly switch from an activated to an unactivated state, and which can simultaneously include both an activated area and an unactivated area.

Commercial electrochromic devices are well known in the art for use as mirrors in motor vehicles. The patent literature also discusses uses of flat types of electrochromic devices for automotive windows, aircraft window assemblies, sunroofs, skylights, and architectural windows. Such electrochromic devices typically include a sealed chamber defined by two pieces of glass that are separated by a gap or space that contains an electrochromic medium. The electrochromic medium typically includes anodic compounds and cathodic compounds together in a solution. The glass substrates typically include transparent conductive layers coated on facing surfaces of the glass and in contact with the electrochromic medium. The conductive layers on both glass substrates are connected to electronic circuitry. When the conductive layers are electrically energized, an applied potential is introduced into the chamber of the device, which electrically energizes the electrochromic medium and causes the medium to change color. For example, when the electrochromic medium is energized, it can darken and begin to absorb light. For the electrochromic rear-view mirror assemblies for motor vehicles, a photocell can be incorporated into the electrochromic cell to detect a change in light reflected by the mirror and activate the electrical potential to dim the mirror.

In the other proposed applications of electrochromic devices, various problems become prevalent as the size of the electrochromic device is enlarged. For instance, rear-view mirror assemblies involve small-scale electrochromic assemblies, typically about 2 inches by 10 inches (5.08 cm to 25.4 cm) in size. In such electrochromic devices, an anodic bus bar is typically arranged at the top portion of the mirror assembly, and a cathodic bus bar is typically arranged at the bottom portion of the mirror assembly.

Automotive windows, architectural windows, and some aircraft windows on the other hand, are much larger in scale. As a result, switching between the lightened and darkened state in an electrochromic rear-view mirror assembly is typically quick and uniform, whereas switching between the lightened and darkened state in a larger scale electrochromic device can be slow and non-uniform. Gradual, non-uniform coloring or switching is a common problem associated with larger scale electrochromic window assemblies, commonly referred to as the "iris effect". This effect is typically due to the potential drop across the surface of the transparent conductive coatings present on the surfaces of the substrates, which results in the applied potential being highest adjacent to the bus bars along the edge of the surface coating and lowest at the center of the cell as the electrical current passes through the electrochromic solution. Accordingly, the electrochromic medium will typically display non-uniform coloring by initially coloring the perimeter of the cell where the bus bars are located, i.e., closest to the point where the applied potential comes in contact with electrochromic medium, and thereafter coloring toward the center of the cell. Traditionally, conductive films having high sheet resistance are used. However, such high sheet resistance films require higher voltages and longer time periods to switch. Moreover, in conventional electrochromic devices, the entire assembly is shaded upon application of electrical potential.

Various attempts have been made to provide more uniform coloring of electrochromic devices to eliminate this iris effect. For example, various electrochromic chemical solutions have been chemically altered to increase uniform coloring.

A need exists for electrochromic devices that are capable of more uniform switching and coloring, can be easily manufactured and can optionally include preferential areas of shading.

The present invention provides an electrochromic window assembly comprising: a first transparent substrate including a first conductive coating on a surface thereof; a second transparent substrate including a second conductive coating on a surface thereof, the first transparent substrate and the second transparent substrate being spaced from each other to define a chamber therebetween; an electrochromic medium contained in the chamber, the electrochromic medium having a luminous transmittance that varies upon application of an electrical potential through the electrochromic medium; a plurality of first spaced facilities contacting the first conductive coating and capable of delivering electrical current to the first conductive coating; and a plurality of second spaced facilities contacting the second conductive coating and capable of delivering electrical current to the second conductive coating to establish the electrical potential through the electrochromic medium. In one nonlimiting embodiment of the invention, the plurality of first spaced facilities and the plurality of second spaced facilities are bus bars arranged about the perimeter of the window assembly. In another nonlimiting embodiment, the window assembly further comprises a controller capable of controlling delivery of electrical current to selected ones of the plurality of first spaced facilities and selected ones of the plurality of second spaced facilities, such that the luminous transmittance through a first portion of the electrochromic medium is different from the luminous transmittance through a second portion of the electrochromic medium.

The present invention also provides a method for providing uniform coloring to an electrochromic window assembly comprising: providing an electrochromic window assembly comprising first and second spaced apart transparent substrates defining a chamber therebetween, the first transparent substrate having a first conductive coating and the second transparent substrate having a second conductive coating, the chamber containing an electrochromic medium capable of coloring upon application of electrical potential thereto to provide reduced luminous transmittance; and applying an electrical current to opposing ends of the first conductive coating and to opposing ends of the second conductive coating to establish the electrical potential through the electrochromic medium, the opposing ends of the first conductive coating and the second conductive coating being spaced from each other, wherein the coloring of the electrochromic medium is uniform.

The present invention further provides a method for providing preferential coloring to a portion of an electrochromic window assembly, comprising: providing an electrochromic window assembly comprising first and second spaced apart transparent substrates defining a chamber therebetween, the first transparent substrate having a first conductive coating and the second transparent substrate having a second conductive coating, the chamber containing an electrochromic medium capable of coloring upon application of electrical potential thereto to provide reduced luminous transmittance; electrically connecting a plurality of first spaced facilities to the first conductive coating for providing the electrical potential to the first conductive coating; electrically connecting a plurality of second spaced facilities to the second conductive coating for providing the electrical potential to the second conductive coating; applying an electrical current to selected ones of the plurality of first spaced facilities and to selected ones of the plurality of second spaced facilities to establish the electrical potential through a selected portion of the electrochromic medium such that the selected portion changes color and reduces its luminous transmittance.

The foregoing summary, as well as the following detailed description of embodiments of the invention, will be better understood when read in conjunction with the appended drawings. In the drawings.

Figure 1:
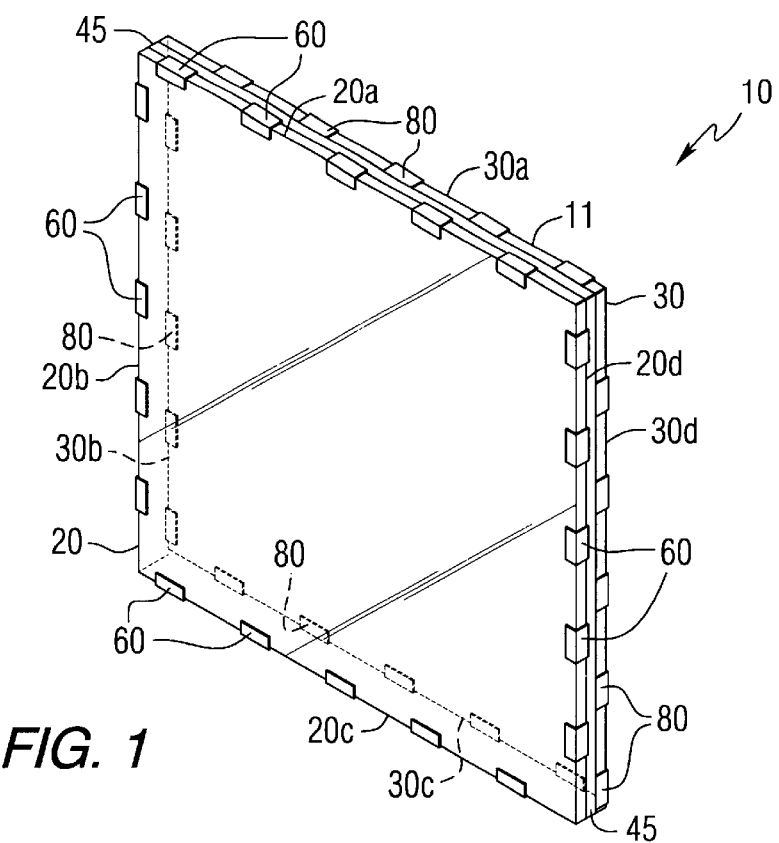
FIG. 1 is a perspective view of an embodiment of an electrochromic window assembly incorporating features to the present invention, with portions removed for clarity.

The present invention is directed to single compartment electrochromic window assemblies having uniform switching or coloring, and which are capable of graded shading (i.e. a gradient shading) or preferentially colored areas. In one nonlimiting embodiment of the invention, the electrochromic window assembly includes a first transparent substrate coated with a first electrically conductive coating and a second transparent substrate coated with a second electrically conductive coating. The first and second transparent substrates are spaced from each other to define a chamber therebetween, with the first and second conductive coatings facing each other. An electrochromic medium, which is capable of reduced light transmittance upon application of an electrical potential through the medium, is contained within the chamber. A plurality of first spaced facilities is further provided in contact with the first conductive coating, e.g. along opposing ends of the first substrate, for providing electrical current thereto, and a plurality of second spaced facilities is provided in contact with the second conductive coating, e.g. along opposing ends of the second substrate, for providing electrical current thereto. When current from a DC power source is applied to the first plurality and second plurality of facilities, an electrical potential is impressed between the coatings and through the electrochromic medium such that the electrochromic medium rapidly and uniformly colors to the desired color, due to the arrangement of the facilities. Moreover, the current can be applied to selected ones of the first and second plurality of facilities and shorted to other selected ones of the first and second plurality of facilities, thereby producing a window assembly including a shaded area in a selected portion of the assembly.

For the purposes of this specification, unless otherwise indicated, all numbers expressing quantities such as dimensions, voltages, luminous transmittance, performance measurements and so forth used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Figure 2:
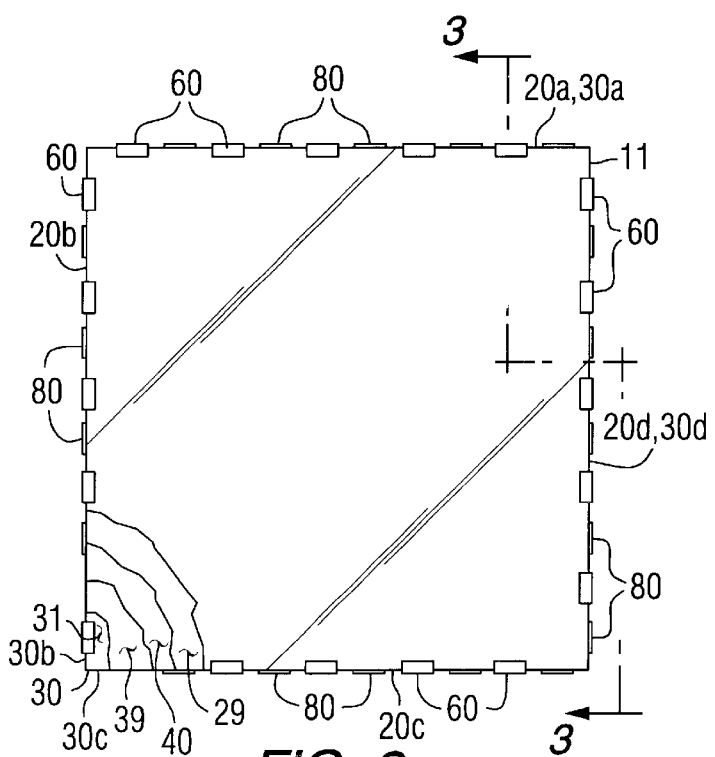
FIG. 2 is a front view of the electrochromic window assembly shown in FIG. 1.
Figure 3:
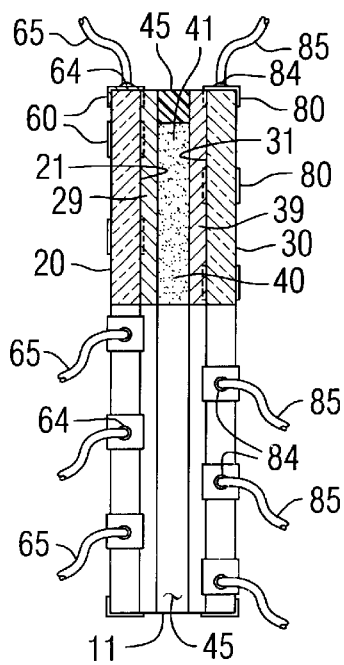
FIG. 3 is a sectional view of the electrochromic window assembly taken along line 3—3 of FIG. 2.

In the following description, like elements bear like reference numerals. Referring to FIGS. 1–3, electrochromic window assembly 10 is depicted. Although not required, in one particular nonlimiting embodiment of the present invention, electrochromic window assembly 10 has a generally symmetrical geometry. For example, electrochromic window assembly 10 can be a square or rectangular shaped window assembly. Such symmetrical shaped window assemblies are particularly useful as architectural glazings, such as windows for buildings. The size and shape of electrochromic window assembly 10 can be selected according to the particular desired use of the assembly.

Electrochromic window assembly 10 includes first transparent substrate 20 and second transparent substrate 30. Such substrates can be made of any material known in the art for use in electrochromic devices, such as but not limited to polymeric materials, glass, metal, and the like, and combinations of such materials. In nonlimiting embodiments of the present invention, at least one or both of substrates 20 and 30 are made of glass, for example, float glass. Moreover, first substrate 20 and second substrate 30 are both transparent. In addition, but not required, one or both of substrates 20 and 30 can be colored or tinted. In one nonlimiting embodiment of the present invention, each of the transparent substrates and coatings incorporated into the aircraft window assembly 10 has a luminous transmittance of at least 70%. As used herein, the terms "luminous transmittance" and "light transmittance" mean the measure of the total amount of visible light transmitted through a transparency. The luminous transmittance data provided in this specification is measured for CIE standard illuminant A and indicted as LTA.

First substrate 20 and second substrate 30 are spaced apart and in a substantially parallel facing relationship with respect to each other, defining a chamber 41 therebetween. Such a relationship can be achieved through spacing element 45. Spacing element 45 can be positioned in any manner capable of maintaining desired spacing between first substrate 20 and second substrate 30. In one nonlimiting embodiment of the invention, spacing element 45 extends about the perimeter of electrochromic window assembly 10 adjacent the outer edges of first substrate 20 and second substrate 30 in a sealing manner, as is known in the art. Although not required, spacing element 45 can be positioned slightly inward from the outer edges of first substrate 20 and second substrate 30. Such positioning provides a slight overhang of the first and second substrates, which can expose a portion of first and second coatings 29 and 39, discussed below, for improved electrical contact. Spacing element 45 can be constructed of any nonelectrically conductive material. In one nonlimiting embodiment of the invention, element 45 is a polymeric material, e.g. curable organic polymeric materials, such as but not limited to a thermoplastic material, thermosetting material, UV curing resin material, and combinations thereof. Epoxy based organic sealing materials are useful as sealing element 45.

The perimeter of first substrate 20 defines opposing ends 20a and 20c, which are opposite each other, as well as opposing ends 20b and 20d, which are opposite each other. Similarly, second substrate 30 includes opposing ends 30a and 30c, as well as opposing ends 30b and 30d.

First substrate 20 and second substrate 30 are each provided with a layer of a transparent electrically conductive material in the form of first conductive coating 29 and second conductive coating 39, respectively, on facing major surfaces 21 and 31, respectively, of the substrates. First and second conductive coatings 29 and 39 can be any material that is substantially transparent to visible light, bonds well to the substrate surfaces, is resistant to corrosion by any materials within the electrochromic device as well as the atmosphere, and has good electrical conductance. Although not required, coatings 29 and 39 typically include one or more metal or metal oxide coatings such as but not limited to silver, gold, tin oxide, indium tin oxide (ITO), fluorine doped tin oxide (FTO), antimony doped tin oxide, ITO/metal/ITO (IMI), as well as any other materials known in the art. Conductive coatings 29 and 39 can be applied by any of several well known methods, including pyrolysis, chemical vapor deposition and magnetron sputtering. First and second conductive coatings 29 and 39 can be constructed from the same or different materials. Without limiting the present invention, coatings useful in the present invention include an electrically conductive fluorine doped tin oxide coated glass available from PPG Industries, Inc. of Pittsburgh, Pennsylvania and marketed under the trademark "NESA®", and an electrically conductive indium tin oxide coated glass available from PPG Industries, Inc. and marketed under the trademark "NESATRON®".

In one nonlimiting embodiment of the invention, first and second conductive coatings 29 and 39 have a sheet resistance ranging from 1 to 10 ohms per square, e.g. ranging from 2 to 5 ohms per square. Further, the thickness of first and second conductive coatings 29 and 39 can be the same or different relative to each other and the coating thickness can be uniform, i.e. the same general thickness throughout, or nonuniform, i.e. the coating thickness varies. In one nonlimiting embodiment of the present invention, the coatings have the same generally uniform thickness, ranging from 5,000 Å to 50,000 Å, e.g. from 13,000 Å to 26,000 Å.

Electrochromic medium 40 is contained within the chamber 41 formed between first substrate 20 and second substrate 30. Electrochromic medium 40 can be any type of material as is known in the art, and can be in any known form, such as but not limited to electrochromic solutions, gels, semi-solid materials, and the like. Electrochromic medium 40 includes at least one electrochromic compound or dye that defines a color. Such materials are well known in the art to color to successively darker colors or shades as a larger electrical potential is applied. When the potential is turned off or reversed, the coloring is removed or bleached, allowing full transmittance of light through electrochromic medium 40.

In one nonlimiting embodiment of the present invention, electrochromic medium 40 is a solution-phase type electrochromic medium, in which a material contained in solution in an ionically conducting electrolyte remains in solution in the electrolyte when electrochemically reduced or oxidized (including a gel). In another nonlimiting embodiment of the present invention, electrochromic medium 40 is a surface-confined electrochromic medium, in which a material that is attached directly to an electronically conducting electrode or confined in close proximity thereto remains attached or confined when electrochemically reduced or oxidized. In still another nonlimiting embodiment of the present invention, electrochromic medium 40 is an electrodeposition-type electrochromic medium, in which a material contained in solution in the ionically conducting electrolyte forms a layer on the electronically conducting electrode when electrochemically reduced or oxidized.

Although not required, in one embodiment, electrochromic medium 40 includes at least one anodic electrochromic compound and at least one cathodic electrochromic compound, with the anodic compound representing an oxidizable material and the cathodic compound representing a reducible material. Upon application of electrical potential to the electrochromic medium, the anodic electrochromic compound oxidizes and the cathodic electrochromic compound simultaneously reduces. Such simultaneous oxidation and reduction results in a change in the absorption coefficient of at least one wavelength in the visible spectrum. The combination of such anodic and cathodic electrochromic compounds in electrochromic medium 40 defines the color associated therewith upon application of an electrical potential. Such cathodic electrochromic compounds are commonly referred to as viologen dyes, and such anodic electrochromic compounds are commonly referred to as phenazine dyes.

Electrochromic medium 40 can also include other materials such as solvents, light absorbers, light stabilizers, thermal stabilizers, antioxidants, thickeners, viscosity modifiers and similar materials.

Although not required, in one nonlimiting embodiment of the invention, at least one edge of coating 29 and/or 39 extend at least in close proximity to an edge of the substrate 20 and/or 30, respectively, i.e. to the perimeter edge 11 of assembly 10, e.g. within 2 inches, or 1 inch or 0.5 inches (5.08 cm, or 2.54 cm or 1.27 cm) of the perimeter edge 11. In the particular nonlimiting embodiment of the invention shown in FIGS. 1–3, the all the edges of coatings 29 and 39 extend at least in close proximity to the perimeter edge 11 of assembly 20, and in one nonlimiting embodiment, all the edges of coating 29 and 39 extend to the edge of their corresponding substrate and thus to the perimeter edge 11 of assembly 10. A plurality of first spaced facilities contacts first conductive coating 29, and a plurality of second facilities contact second conductive coating 39. In one nonlimiting embodiment of the present invention, the plurality of first spaced comprises a plurality of bus bars 60, and the plurality of second facilities comprise a plurality of bus bars 80. Without limiting the present invention, in one particular embodiment, bus bars 60 are anodic bus bars while bus bars 80 are cathodic bus bars. Such bus bars 60 and 80 provide electrical connection between a DC power source (not shown in FIGS. 1–3) and first and second conductive coatings 29 and 39, respectively. Such electrical connection can be established in any known manner. For example, each of anodic bus bars 60 can be connected to an anodic conductive wire 65 by solder joint 64, while each of cathodic bus bars 80 can be connected to a cathodic conductive wire 85 by solder joint 84, as shown in FIG. 3. In this manner, a positive current is applied to the anodic bus bars 60 and a negative current is applied to the cathodic bus bars 80, producing an electrical potential therebetween within the electrochromic cell. Further, an external cover or insulator (not shown) can be provided about the perimeter edge 11 of electrochromic window assembly 10 to protect spacing assemblies 45, wires 65 and 85 and/or joints 64 and 84.

In the particular embodiment of the invention shown in FIGS. 1–3, the edges of coating 29 extend to the perimeter edge 11 of assembly 10 and anodic bus bars 60, which are in contact with first conductive coating 29, are provided along opposing ends 20a and 20c of first substrate 20. In this manner, electrical current from the power source is provided to the opposing edges of the first conductive coating 29 along opposing ends 20a and 20c of first substrate 20. Similarly, the edges of coating 39 extend to the perimeter edge 11 of assembly 10 and cathodic bus bars 80, which are in contact with second conductive coating 39, are provided along opposing ends 30b and 30d of second substrate 30. In this manner, electrical current from the power source is provided to the opposing edges of the second conductive coating 39 along opposing ends 30b and 30d of second substrate 30. Furthermore, these opposing ends of first and second coatings 29 and 39 to which the electrical current is applied are spaced from each other. Without wishing to be bound by any particular theory, it is believed that by applying the current to opposite ends of the coatings and spacing the ends of a first coating that are energized with a positive current from the ends of a second coating that are energized by a negative current results in a uniform application of electrical potential throughout the entire electrochromic cell, resulting in uniform coloring of the electrochromic medium and reducing the iris effect. As used herein, the term "uniform coloring" means that those portions of the electrochromic medium that change color due to the applied electrical potential, all change generally in the same manner, e.g. generally at the same time and/or generally at the same rate.

In another nonlimiting embodiment of the present invention, bus bars 60 are arranged along opposing edges 20a and 20c as well as along opposing edges 20b and 20d, and bus bars 80 are arranged along opposing edges 30b and 30d as well as along opposing edges 30a and 30c. In this manner, the anodic bus bars 60 are provided about the perimeter of the entire first substrate 20 and the cathodic bus bars 80 are provided about the perimeter of the entire second substrate 30, i.e. bus bars 60 and 80 are positioned about the entire perimeter edge 11 of assembly 10. In one particular nonlimiting embodiment shown in FIGS. 1–3, bus bars 60 and bus bars 80 are arranged in alternating fashion, i.e. each bus bar 60 is arranged between each bus bar 80 about the perimeter edge 11 of window assembly 10. Such an arrangement provides uniform application of electrical potential through the entire electrochromic window assembly 10. Although not required, in one nonlimiting embodiment of the invention, each anodic bus bar 60 is spaced from each cathodic bus bar 80 along the perimeter edge 11 of the window assembly 10 a distance of at least 0.5 inches (1.27 cm). Such spacing ensures that the current between the bus bars will not short and provides uniform electrical potential through the entire electrochromic device. In addition, this bus bar configuration provides that even under prolonged application of an electrical potential, dye segregation is minimized. Dye segregation is the tendency of the dyes to migrate toward and concentrate at the portion of the assembly where the electrical power is the greatest, typically along the bus bars.

Bus bars 60 and 80 can be made of any highly conductive material typically used for bus bars and well known in the art. Nonlimiting examples of typical bus bar materials include metal foil, e.g. copper foil, metal coating, e.g. gold coatings, and conductive metal containing ceramic paints, e.g. silver ceramic paint.

The size and shape of bus bars 60 and 80 can be tailored to the particular geometry of the electrochromic window assembly. In one nonlimiting embodiment of the present invention, each of bus bars 60 and 80 are at least 0.5 inches (1.27 cm) in length.

As indicated, electrochromic medium 40 is capable of changing its color and thus its light transmittance when an electrical potential is applied through the medium. Application of the electrical potential can be selective, i.e. the electrochromic window assembly is switchable between one level of transmittance, when no electrical potential is applied, and a second level of transmittance, when electrical potential is applied to change the color of the dyes and reduce the luminous transmittance of the electrochromic medium 40. This feature is most easily accomplished by providing a switch for selectively applying electrical current to the window assembly.

In one nonlimiting embodiment of the present invention, the coloring of the electrochromic medium between the energized and non-energized electrical states is self-erasable, i.e. the coloring of the electrochromic medium when in an electrochemically activated state upon application of an electrical potential, automatically returns or erases to its original state, e.g. colorless state, when the electrical potential is removed. In should be appreciated that the original state can be a colorless state or it can have a color or tint.

In a further nonlimiting embodiment, the electrochromic window assembly is switchable and non-self-erasing, i.e. application of the electrical potential causes the electrochromic medium to color, and the electrochromic medium will remain in the colored state until the electrical potential is reversed or shorted.

Moreover, the color of the dye can be of a constant darkness or shade upon application of an electrical potential, or it can be of varying degrees of darkness or shading depending upon the magnitude of the electrical potential established through the electrochromic medium. For example and without limiting the present invention, specific coloring or shading of the coloring can be varied over a range of voltages and power densities. Upon application of a low power density to the electrochromic medium, the dye can begin to color. Increasing the voltage can cause the color of the dye to darken to a deeper shade or intensity. In this manner, the window assembly can include varying degrees of light transmittance upon varying of the electrical potential. The window assembly can, therefore, be adjusted to a desired level of darkness or shading based upon the amount of electrical potential applied thereto. This can be easily accomplished, for example, by incorporating a switch or some other control between the electrical power source and the window assembly, as will be discussed later in more detail. Although not required, in one nonlimiting embodiment of the present invention, the electrochromic window assembly is switchable between a minimum LTA value ranging from 1 to 20 percent and a maximum LTA value ranging from 60 to 80 percent. As such, the electrochromic window assembly can effectively function as an opaque shade for a window when desired.

Figure 4:
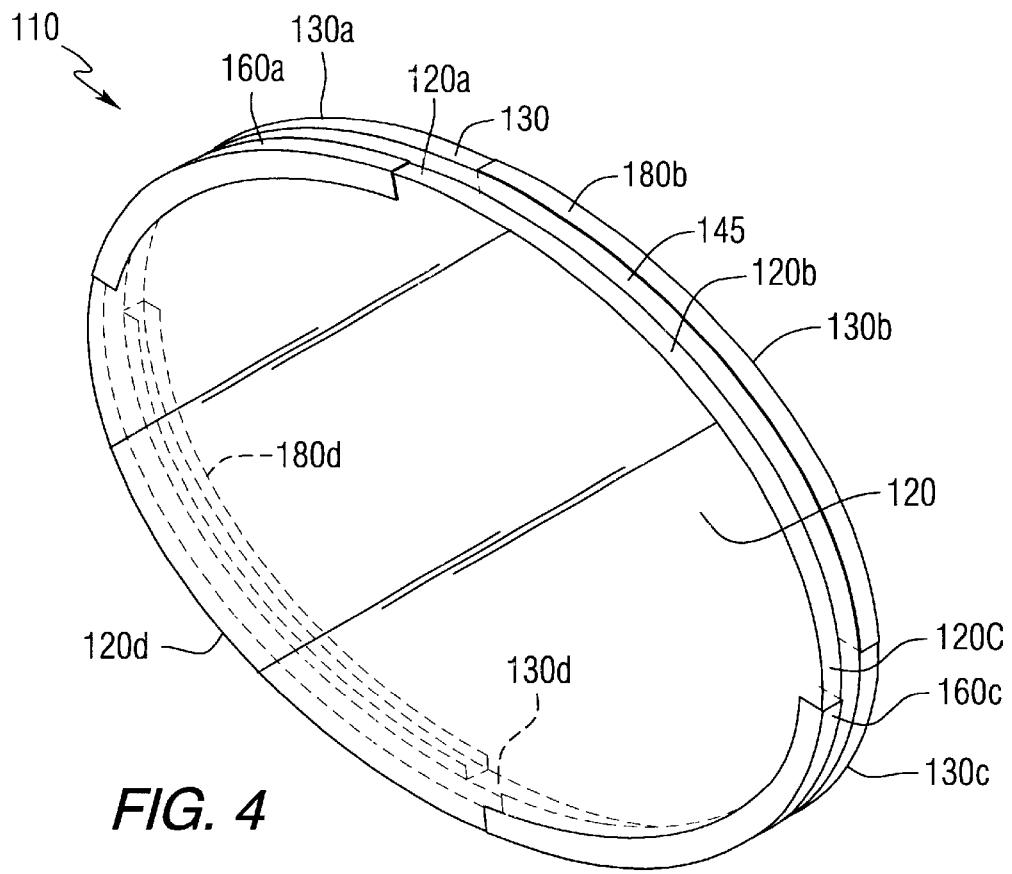
FIG. 4 is a perspective view of an alternate embodiment of an electrochromic window assembly incorporating features of the present invention, having an oval-shaped geometry, for example, for use as an aircraft cabin window.
Figure 5:
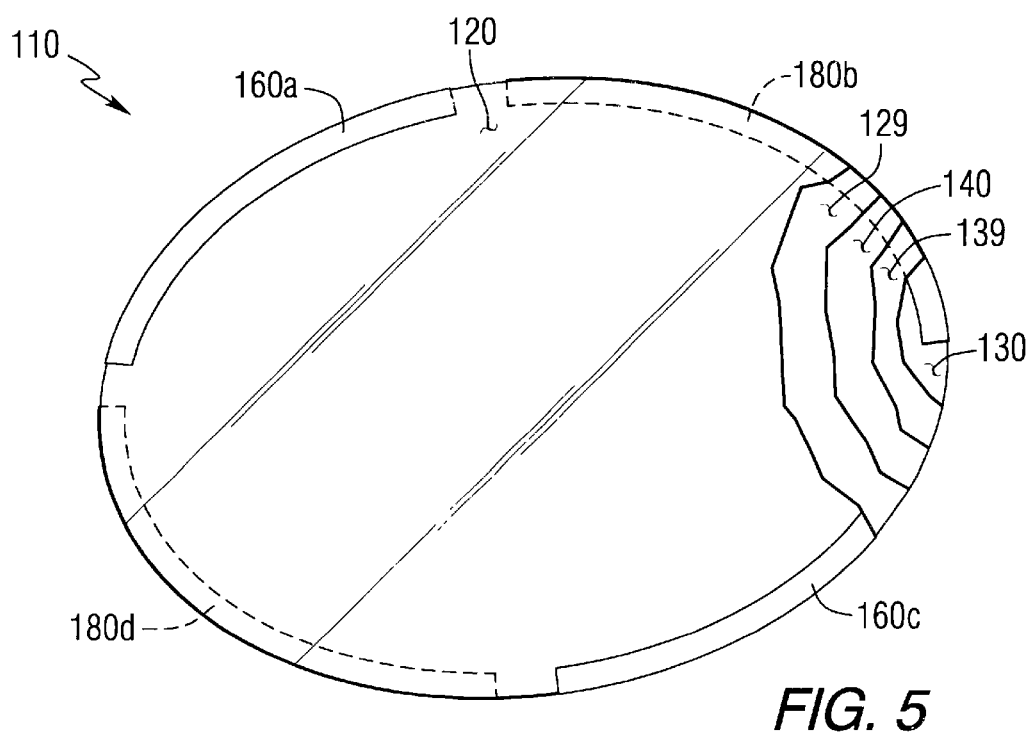
FIG. 5 is a front view of the electrochromic window assembly shown in FIG. 4.

An alternate nonlimiting embodiment is shown in FIGS. 4 and 5. In this particular embodiment, electrochromic window assembly 110 is in the form of a generally oval shaped window, which can be used, for example, as an aircraft cabin window. Although not required, in this particular embodiment of the invention, the oval shaped window has a symmetrical geometry, as with the embodiment described above. In a similar manner, electrochromic window assembly 110 includes spaced apart first substrate 120 and second substrate 130, as well as first conductive coating 129, second conductive coating 139 and electrochromic medium 140 therebetween. Coatings 129 and 139 are applied to opposing facing surfaces of substrates 120 and 130, respectively, and electrochromic medium 140 is positioned between the coatings. Substrates 120 and 130 are separated by spacer 145.

Bus bar 160a is connected to an edge of first conductive coating 129 along first end 120a of first substrate 120, and bus bar 160c is connected to an opposing edge of first conductive coating 129 along opposing second end 120c of first substrate 120. Further, bus bar 180b is connected to an edge of second conductive coating 139 along first end 130b of second substrate 130, and bus bar 180d is connected to an opposing edge of second conductive coating 139 along opposing second end 130d of second substrate 130. Although not required, in one nonlimiting embodiment of the invention, bus bars 160a and 160c are anodic bus bars, while bus bars 180b and 180b are cathodic bus bars. Application of electrical current to opposing ends of coating 129 through bus bars 160a and 160c, and to opposing ends of coating 139 through bus bars 180b and 180d, and spacing the energized opposing ends of coating 129 from the energized opposing ends if coating 139 generates an electrical potential through the electrochromic medium 140 and causes the electrochromic medium 140 to change color in a uniform manner.

In the embodiment depicted in FIGS. 4 and 5, the size and shape of bus bars 160 and 180 are longer in length relative to the bus arrangement of FIG. 1. Although not required, in one nonlimiting embodiment of the present invention, each of bus bars 160 and 180 are equal in length, and bus bars 160 and 180 are spaced about the perimeter edge of the assembly 110 at least 0.5 inches (1.27 cm) apart.

Figure 6:
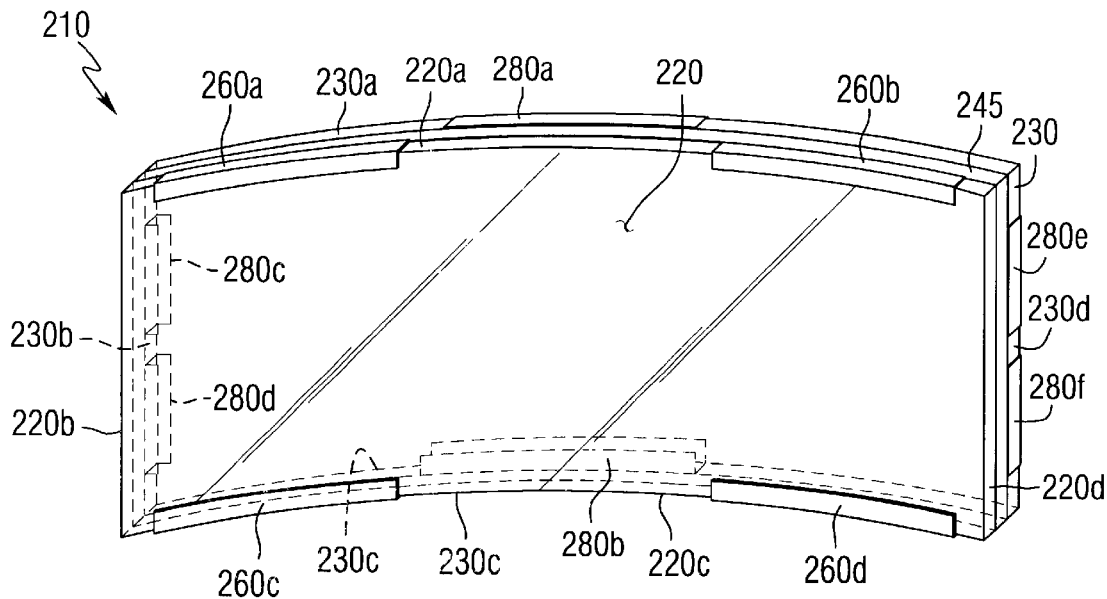
FIG. 6 is a perspective view of an electrochromic window assembly incorporating features of the present invention useful, for example, as an automobile windshield, automobile sunroof, or architectural glazing.
Figure 7:
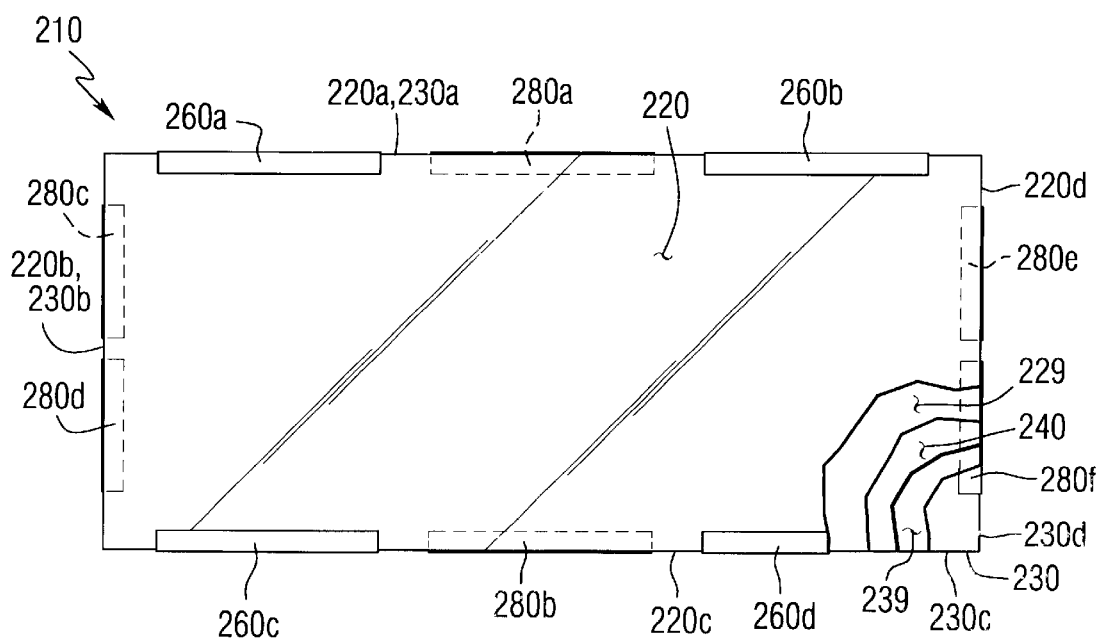
FIG. 7 is a front view of the electrochromic window assembly shown in FIG. 6.

FIGS. 6 and 7 shown a nonlimiting electrochromic window assembly 210 having a generally symmetrical rectangular geometry. Such an assembly can be useful, for example, as an automobile windshield, rear window or sunroof, or as an architectural glazing. In a similar manner as the previous embodiments, electrochromic window assembly 210 includes spaced apart first substrate 220 and second substrate 230, as well as first conductive coating 229, second conductive coating 239 and electrochromic medium 240. Coatings 229 and 239 are applied to opposing facing surfaces of substrates 220 and 230, respectively and electrochromic medium 240 is positioned between the coatings. Substrates 220 and 230 are separated by spacer 245.

Assembly 210 further includes bus bars 260 and 280. Although not required, in this particular embodiment of the invention, bus bars 260 are anodic bus bars and bus bars 280 are cathodic bus bars. Anodic bus bars 260a and 260b are connected to a first edge of first conductive coating 229 along first end 220a of first substrate 220, and bus bars 260c and 260d are connected to an opposing edge of first conductive coating 229 along opposing second end 220c of first substrate 220. Further, cathodic bus bar 280a is connected to a first edge of second conductive coating 239 along first end 230a of second substrate 230 at a position spaced between anodic bus bars 260a and 260b, and cathodic bus bar 280b is connected to a second opposing edge of second conductive coating 239 along opposing second end 230c of second substrate 230 at a position spaced between anodic bus bars 260c and 260d. Further, bus bars 280c and 280d are connected to a third edge of second conductive coating 239 at third end 230b of second substrate 230, and bus bars 280e and 280f are connected to a fourth opposing edge of second conductive coating 239 at opposing fourth end 230d of second substrate 230. Application of electrical current to opposing ends of coating 229 through bus bars 260a, 260b, 260c and 260d, and about the periphery of coating 239 through bus bars 280a, 280b, 280c, 280d, 280e and 280f generates an electrical potential through the electrochromic medium 240 and causes the electrochromic medium 240 to change color in a uniform manner.

Although not required, in the particular nonlimiting embodiment of the invention shown in FIGS. 6 and 7, bus bars 260 and 280 are equal in length, and bus bars 260 and 280 are spaced about the perimeter edge of the assembly 210 at least 0.5 inches (1.27 cm) apart.

Figure 8:
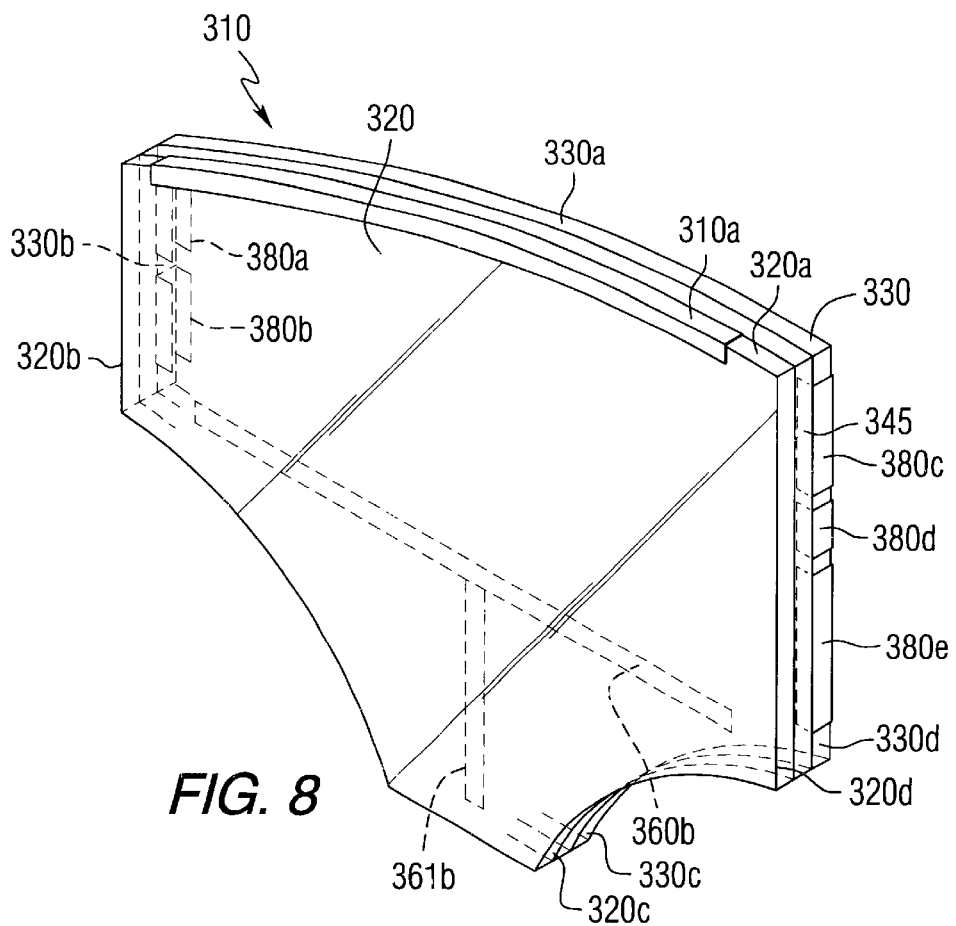
FIG. 8 is a perspective view of an alternate embodiment of an electrochromic window assembly incorporating features of the present invention and having a non-symmetrical geometry useful, for example, as an automobile sidelite or aircraft cockpit window.
Figure 9:
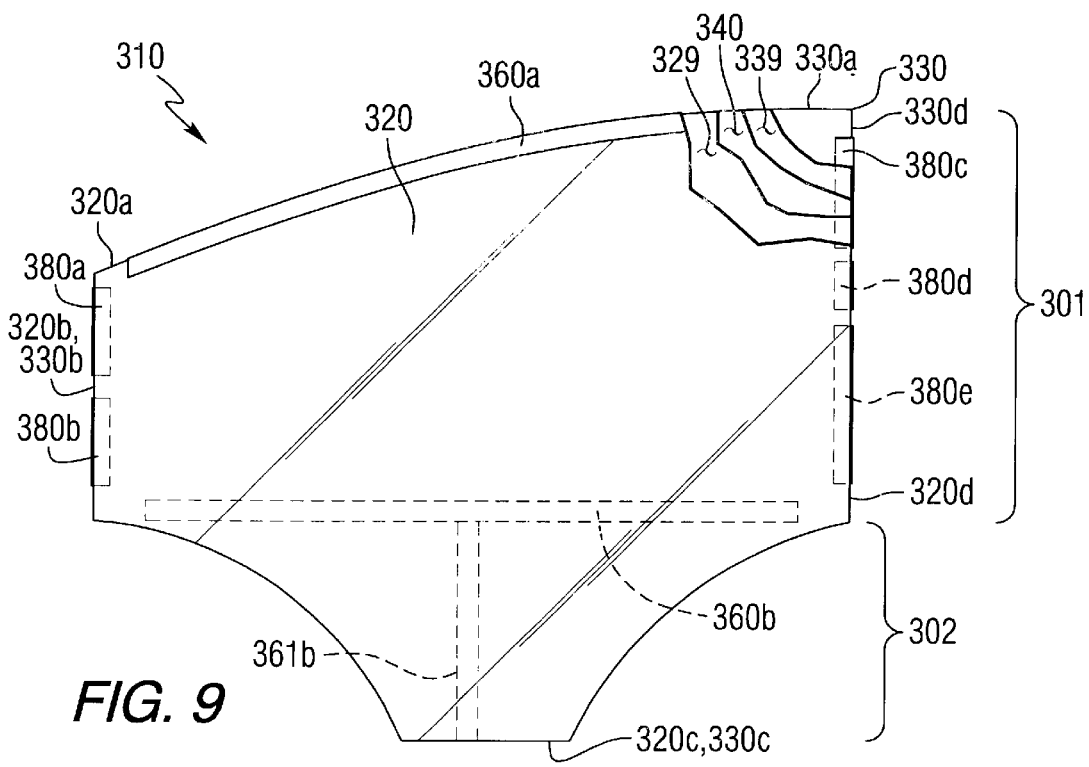
FIG. 9 is a front view of the electrochromic window assembly as shown in FIG. 8.

A further nonlimiting embodiment of the present invention is shown in FIGS. 8 and 9, in which electrochromic window assembly 310 includes a non-symmetric geometry. While such a non-symmetrical electrochromic window assembly can be provided for any application, the specific nonlimiting embodiment shown is in the form of an automobile side window, commonly referred to as a sidelite. Electrochromic window assembly 310 includes a first portion 301 and a second portion 302. In use as an automobile sidelite, first portion 301 represents the portion of the window assembly which is above the door panel of an automotive vehicle and visible when the window is closed, while second portion 302 represents the portion of the window assembly that remains below the door panel at all times, including when the window is closed, and is therefore not visible. Electrochromic window assembly 310 includes spaced apart first substrate 320 and second substrate 330, as well as first conductive coating 329, second conductive coating 339 and electrochromic medium 340, as with the previously discussed embodiments. Coatings 329 and 339 are applied to opposing facing surfaces of substrates 320 and 330, respectively, and electrochromic medium 340 is positioned between the coatings. Substrates 320 and 330 are separated by spacer 345.

Electrochromic assembly 310 includes bus bar 360a connected to an edge of first conductive coating 329 along first end 320a of first substrate 320, and bus bar 360b connected to first conductive coating 329 along a lower portion of first substrate 320 near opposing second end 320c. Although bus bar 360b could be positioned along edge 320c of substrate 320, in the particular embodiment of the invention shown in FIGS. 8 and 9, bus bar 360b is not positioned along edge 320c, for reasons that will be discussed later in more detail. Electrochromic assembly 310 further includes bus bars 380a and 380b connected to a first edge of second conductive coating 339 along first end 330b of second substrate 330, and bus bars 380c, 380d and 380e connected to an opposing second edge of second conductive coating 339 along opposing second end 330d of second substrate 330. Although not required, in one nonlimiting embodiment, bus bars 360a and 360b are anodic bus bars, while bus bars 380a, 380b, 380c, 380d and 380e are cathodic bus bars. Application of electrical current to coatings 329 and 339 through bus bars 360a, 360b, 380a, 380b, 380c, 380d and 380e generates an electrical potential through the electrochromic medium 340, causing the electrochromic medium 340 to change color in a uniform manner.

As noted, electrochromic window assembly 310 includes a non-symmetrical geometry. In particular, the side of window assembly 310 formed by first ends 320b and 330b of substrates 320 and 330, respectively, is shorter in length than the opposing side of window assembly 310 formed by second ends 320d and 330d. As such, in this particular nonlimiting embodiment, the bus bar arrangement is adjusted to compensate for such non-symmetrical shape. For example, with respect to the cathodic bus bar arrangement, two bus bars 380a and 380b are provided in contact with second conductive coating 339 along end 330b, while three bus bars 380c, 380d and 380e are provided in contact with second conductive coating 339 along opposing end 330d. Further, the length of these bus bars can be adjusted to provide for an appropriate fitting and geometry, as well as appropriate level of current flow. Such an arrangement with differing number and differing lengths of bus bars compensates for the current flow across the electrochemical cell due to the non-symmetrical geometry of the electrochromic window assembly 310.

In addition, the current applied to the bus bars can be adjusted in order to compensate for the non-symmetrical shape. For example and without limiting the present invention, resistors (not shown) can be incorporated into the current flow to bus bars 380a and 380b in order to reduce the amount of current flowing to these bus bars. As such, compensation is provided for the applied potential to the non-symmetrical assembly. As an alternative, a controller can be used to control the current delivered to each bus bar, as will be discussed later in more detail.

With continued reference to FIGS. 8 and 9, while the top edge of window assembly 310, formed by first ends 320a and 330a, is uniform and only slightly curved, the opposing edge of window assembly 310, formed by second ends 320c and 330c, is entirely non-uniform, having curved portions and a straight portion, resulting in a non-symmetrically shaped window assembly having varying distances between opposing edges at different portions. As such, arrangement of the bus bars at this portion of the window assembly is difficult. To compensate for such non-symmetric geometry, in the particular embodiment of the invention shown in FIGS. 8 and 9, a single bus bar 360b is provided in electrical contact with first conductive coating 329. Such an internal bus bar 360b can be provided, e.g. by adhesively attaching bus bar 360b to first conductive coating 329 with a conductive adhesive along substrate 320. A nonelectrically conductive layer (not shown), such as but not limited to adhesive tape, can be placed over bus bar 360b to act as an insulator, preventing bus bar 360b from electrically contacting second conductive coating 339. Such adhesive tape can further act as a spacer, maintaining appropriate spacing between first substrate 320 and second substrate 330. Internal bus bar 360B can be made of the same materials as discussed earlier for the other bus bars.

As a result, in one nonlimiting embodiment of the present invention, the electrochromic assembly includes at least one bus bar spaced from the edge of the assembly and positioned within the assembly.

Although not required, in the particular embodiment of the invention shown in FIGS. 8 and 9, a portion 361b of internal bus bar 360b extends toward an edge of window 310, for example perpendicularly as shown in FIGS. 8 and 9 to edge 320c, to provide external contact with the conductive wire for electrical connection of the bus bar 360b with a power source. Since this internal bus bar arrangement is contained within portion 302 of window assembly 300, none of the components are visible, as portion 302 is maintained within the door panel of the automobile. As an alternative, at least a portion of the bus bar 360b can be positioned within section 301 of assembly 300.

With respect to the automobile sidelite shown in FIGS. 8 to 9, it is noted that in an alternative embodiment, the bus bar contacts can be provided on exterior top and side edges of the window assembly, with separate contact points provided within the frame of the automobile for establishing contact with the power source. This arrangement provides an appropriate assembly for automobile windows that are not encased within a door frame, since there is no external cover in such an arrangement to conceal the contacts. Such an arrangement would not be detrimental to the darkening of the window assembly, since closing the window would permit contact with the power source, and since it would not be necessary to shade the window when the window is open.

The amount of current applied to the electrochromic window assembly can be selected based on the specific assembly and the specific electrochromic medium used. In one nonlimiting embodiment of the invention, the amount of current applied ranges from 0.4 volts to 1.2 volts, e.g. from 0.5 volts to 1.0 volts.

Use of the electrochromic window assembly will now be described, with specific reference to FIGS. 8 to 9 as exemplary of the present invention. Electrochromic window assembly provided as described above, is a generally transparent assembly when no electrical potential is applied thereto. As such, electrochromic window assembly 310 is in the lightened state and full light transmittance is possible. When darkening of the window assembly is desired, the electrochromic window assembly is activated, for example by a switch that is activatable by the user. Activation of the switch causes the power source to supply current to bus bars 360 and 380 in any convenient manner, e.g. through the wire leads attached thereto, and to first and second conductive coatings 329 and 339. Such current causes an application of electrical potential to the electrochromic medium, which in turn causes the at least one anodic electrochromic compound to oxidize and the at least one cathodic electrochemical compound to reduce. This reaction results in a change in color of the electrochromic medium such that the electrochromic medium begins to absorb light and darken. Since the electrical potential between coatings 329 and 339 is applied through the bus bar arrangement as set forth above, the coloring of the electrochromic medium is rapid and uniform throughout the entire electrochromic window assembly, without any iris effect or gradual change in color.

Deactivation of the assembly 310 causes the supply of power to be interrupted to bus bars 360 and 380. As such, the potential being applied to electrochromic medium 340 is removed. Such deactivation can be affected using the same switch arrangement as discussed above to activate the assembly 310. As discussed earlier, in the case of a self-erasing electrochromic medium, the window assembly 310 will return to its original state. In the case of a non-self-erasing electrochromic medium, the color will remain until the electrical potential through the medium is reversed.

In a further embodiment of the present invention, only a portion of the electrochromic window assembly can be colored to establish a partially shaded window. Such partial shading can be achieved by selectively applying current to a selected number of the anodic bus bars and cathodic bus bars, thereby creating the electrical potential through only a portion of the electrochromic window assembly. For example, when such a window assembly 310 is in the form of an automobile sidelite, it can be desirable to create a darkened or shaded top area of the sidelite in order to reduce the level of sunlight transmitted therethrough, while maintaining a lightened state at the middle and bottom areas of the sidelite to maintain a high level of light transmittance therethrough, for example to more easily view the side-view mirrors. In the particular embodiment of the invention shown in FIGS. 8 and 9, such preferential area shading can be accomplished, for example, by applying current only to anodic bus bar 360a and cathodic bus bars 380a and 380c, as will be discussed later in more detail. Such selective application of current establishes an electrical potential at only a selected portion of electrochromic window assembly 310, and in this particular embodiment, along the top area portion of assembly 310. As such, only a portion of the electrochromic medium between these areas of current application will change color, resulting in a partially shaded assembly, i.e. the luminous transmittance through the portion of the electrochromic medium between the energized portions of the coatings (due to selective powering of the bus bars) will change as compared to those portions of the electrochromic medium that are not between the energized portions of the coatings.

It is noted that prolonged application of electrical current to a selected number of facilities in this manner can result in "bleeding" of the electrochromic medium, in which the electrochromic medium in the areas of the electrochromic window assembly to which electrical current is not applied gradually begins to color to a darkened state. This is believed to be due to the current flowing through the entire conductive layer even though the electrical current is only applied to a portion of the conductive layer, thus enlarging the area of the electrochromic medium through which the electrical potential is applied. The amount of bleeding is based on the specific sheet resistance of the conductive coatings. For example, incorporating conductive coatings having a higher sheet resistance will reduce this bleeding effect somewhat. Increased sheet resistance will, however, consume more power to switch the color of the device, and will take a longer period of time to achieve full coloring and switching of the device.

In order to avoid this bleeding effect, particularly with low sheet resistance conductive coatings, it is possible to ground or short the current at the facilities which are not selected for application of electrical current to create the shaded area. For example and as discussed above, in FIGS. 8 and 9, the partially shaded window assembly can be achieved by selectively applying current to anodic bus bar 360a and cathodic bus bars 380a and 380c. By grounding or shorting the current at the remaining bus bars, namely anodic bus bar 360b and cathodic bus bars 380b, 380d and 380e, no electrical potential is applied to the bottom area of electrochromic window assembly 310. Thus, the color of electrochromic medium 340 at the bottom portion of assembly 310 is generally maintained in a lightened state, and any bleeding effect of coloring from the top portion which is colored due to application of electrical potential is reduced.

Still further, the electrochromic window assembly can include a gradient shading across the surface thereof, such that electrochromic window assembly gradually changes from a lightened state, through successively darker shaded sections to a darkened state. This can be accomplished in a similar manner as described above with respect to the preferentially shaded area, by applying varying voltages to different facilities in order to achieve varying degrees of darkening of the electrochromic medium. For example and with further reference to FIGS. 8 and 9, to achieve a graded shading effect in one nonlimiting embodiment of the invention, a voltage of 0.7 volts can be applied to bus bars 360a, 380a and 380c and a decreased voltage of 0.4 volts can be applied to bus bars 380b and 380d. Although not required, the electrical current can further be grounded or shorted to bus bars 360b and 380e. As such, electrochromic window assembly 310 can be gradually shaded from a darkened state at the top portion, through a slightly darkened state at the middle portion to a lightened state at the bottom portion.

In another nonlimiting embodiment of the present invention, it is possible to achieve a gradient shading across the electrochromic window assembly, such that a portion of the electrochromic window assembly is fully colored, while a separate portion of the electrochromic window assembly is only partially colored. For example and without limiting the present invention, a voltage of 0.7 volts can be applied to bus bars 360a, 380a and 380c while a voltage of 0.4 volts is applied to bus bars 360b, 380b, 380d and 380e. As such, electrochromic window assembly 310 will include a gradient shading from a completely darkened state at the top portion, through a slightly darkened state at the bottom portion.

It is noted that while such preferential shading and/or gradual gradient shading of the electrochromic window assembly has been discussed with particular reference to the geometry of FIGS. 8 and 9 and referring to an automobile sidelite, it is contemplated that such shading or gradient shading can be accomplished with any electrochromic window assembly, such as but not limited to, the specific assemblies shown and discussed above. For example, in one particular, nonlimiting embodiment, the electrochromic window assembly is an automobile windshield, with the portion of the assembly that is selectively colored being the upper edge portion of the windshield, which typically corresponds to the shade band. With reference to FIGS. 6 and 7, this can be accomplished, for example, through application of an electrical current to bus bars 260a, 260b, 280a, 280c, and 280e, while shorting bus bars 260c, 260d, 280b, 280d, and 280f. This will cause a top portion of electrochromic window assembly 200 to darken and the bottom portion to remain in a lightened state.

In a further embodiment, the electrochromic window assembly can be an automobile sunroof, with one side of the assembly being selectively colored. With reference to FIGS. 6 and 7, this can be accomplished, for example, through application of an electrical current to bus bars 260a, 260c, 280c, and 280d, while shorting bus bars 260b, 260d, 280a, 280b, 280e, and 280f, causing one side portion of electrochromic window assembly 200 to darken and the other side portion to remain in a lightened state.

It shown be appreciated that due to the multiple anodic and cathodic bus bars positioned about the perimeter edge 11 of window assembly 10 as shown in FIG. 1 and discussed in detail above, this embodiment can also be operated in a manner that darkens one or more selected portions of assembly 10 and/or produces a gradient shading in one or more selected portions of assembly 10.

Figure 10:
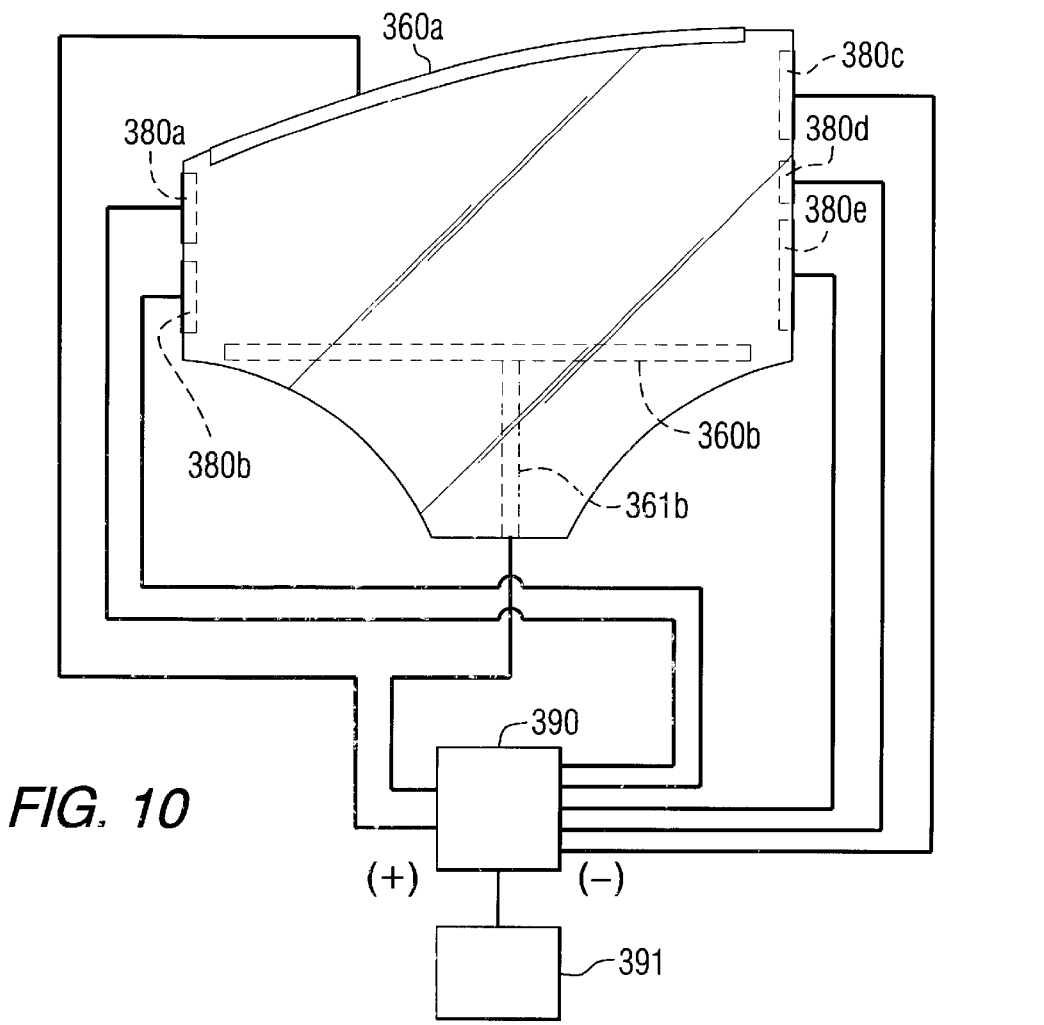
FIG. 10 illustrates one embodiment of electrical circuitry useful in connection with the present invention.

In order to control the darkening pattern of the electrochromic window assemblies of the types disclosed herein, a controller can be used to control power distribution to the conductive coatings. For example and referring to FIG. 10, a controller 390 can be used to control the electrical power supplied to each bus bar in assembly 310 by a DC power source 391. More particularly, controller 390 can control whether a particular bus bar is energized (i.e. current is delivered to the bus bar), not energized or shorted. In addition, controller 390 can control how much current is delivered to the particular bus bar. By controlling where and how much current should be supped to the coatings, the controller 390 can establish an electrical potential through only a selected portion of the electrochromic medium such that its luminous transmittance through the selected portion is different from its luminous transmittance through its other portions. As a result, the controller 390 can be used to produce a desired change in the luminous transmittance of the assembly, such as but not limited to, darkening a selected portion of the assembly or providing a gradient shading as discussed earlier. The controller 390 can also control the current as required to account for non-symmetrical features of the assembly, e.g. shape, bus bar length, coating thickness, etc.

The features and advantages of the present invention will be further described and understood through the following examples, which are not to be construed as limiting the scope of the invention.

EXAMPLE

Figure 11:
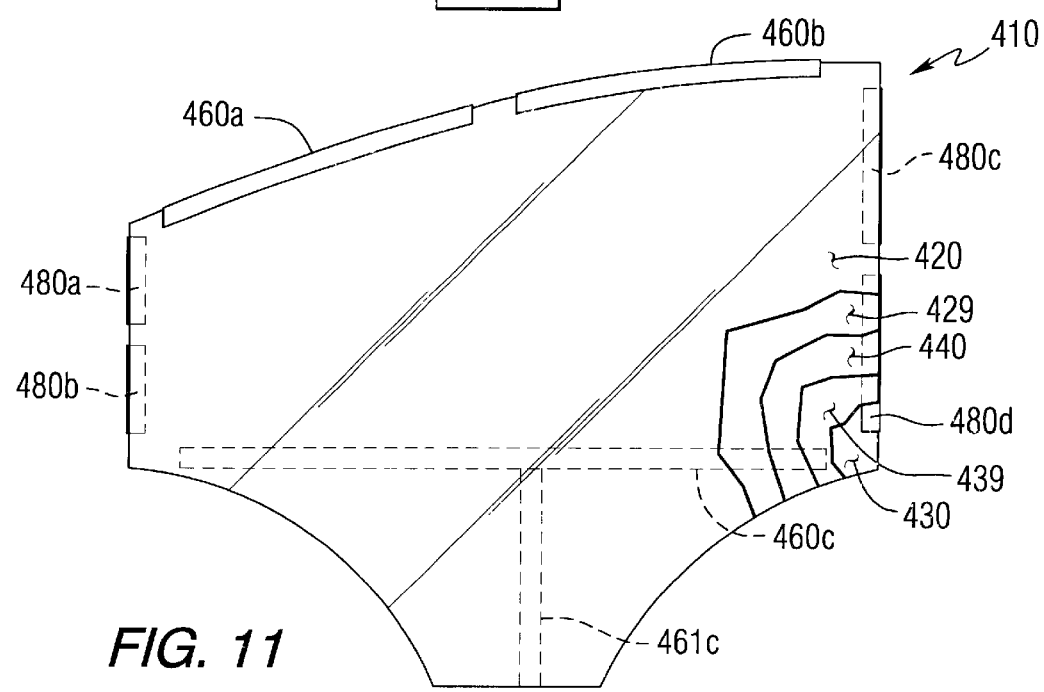
FIG. 11 is a front view of an electrochromic window assembly similar to the assembly shown in FIG. 8 that was used for testing.

An electrochromic window assembly 410 in the form of an automobile side window or sidelite was constructed as follows. A first glass substrate 420 having a geometry as shown in FIG. 11, with an overall size of approximately 23 inches (58.42 cm) in width and 21 inches (53.34 cm) in length, and has a thickness of approximately 80 mils (2.03 mm), was provided. This first substrate 420 was coated on one surface with a coating 429 of ITO using magnetic sputter vapor deposition (MSVD) techniques which are well known in the art to provide a conductive layer. The resistance of the conductive coating 429 was 2 ohms per square and the conductive coating was applied to a thickness of 25,000 Å. A second glass substrate 430 similar to that of the first glass substrate 420 was provided with a conductive coating 439 in a similar manner, with the conductive coating 439 being applied to a surface of the second substrate 430 facing the coated surface of the first glass substrate 420.

Anodic bus bars were provided on opposing edges of the first conductive coating 429. More particularly, a first pair of anodic bus bars 460a and 460b was provided across the top edge of the first substrate 420 using 3 mil thick copper foil strips that were secured to the first conductive coating 429 by a conductive adhesive. A portion of each strip was laminated within assembly 410 and the remainder of each strip was wrapped around the edge of the first substrate 420. Bus bars 460a and 460b were 10.5 inches and 10.25 inches (26.67 cm and 26.04 cm) in length, respectively, and were separated by 0.5 inches (1.27 cm). A third anodic bus bar 460c was provided by way of a separate strip of 3 mil thick copper adhesively attached across a lower portion of the first substrate 420 directly on the first conductive coating 429, with a further strip 461c of copper also adhesively attached directly on the first conductive coating perpendicular to and in contact with bus bar 460c, and extending to the edge of the window assembly 410. Adhesive tape was provided as insulation over bus bars 460c and strip 461c. Bus bar 460c was 20.5 inches (52.07 cm) long.

Four cathodic bus bars were provided on opposing edges of the second substrate 430 in contact with the second conductive coating 439. More particularly, cathodic bus bars 480a and 480b in the form of two separate copper strips spaced 0.5 inches (1.27 cm) from each other and across one side edge of the second substrate 430 were provided in contact with a first edge of the second conductive coating 439, and cathodic bus bars 480c and 480d in the form of two additional separate copper strips spaced 0.5 inches (1.27 cm) from each other and across the opposite side edge of the second substrate 430 were provided in contact with an opposing edge of the second conductive coating 439. Each of the bus bars were made of 3 mil thick copper foil and secured to the respective conductive coating by a conductive adhesive. A portion of each strip was laminated within assembly 410, and the remainder of each strip was wrapped around the edge of second substrate 430. Bus bars 480a, 480b, 480c and 480d were 4.25 inches, 7.25 inches, 4.25 inches and 11.75 inches (10.80 cm, 18.42 cm, 10.80 cm and 29.85 cm) in length, respectively The two glass substrates 420 and 430 were spaced apart approximately 24 mils (0.61 mm), with the conductive coatings 429 and 439 facing each other. A polymeric resin was applied between the two substrates around the perimeter of the assembly to act as a spacer. An electrochromic medium 440, including a viologen dye and a phenazine dye, capable of coloring upon application of electrical potential thereto was injected between the two substrates. The luminous transmittance (LTA) through the electrochromic window assembly 410 in an uncharged state, i.e. when no current was applied, was approximately 54%.

The anodic and the cathodic bus bars were connected to a DC power source through wire leads. Various levels of current were applied to different sets of bus bars, as set forth below. Because the edge of the assembly 410 along bus bars 480a and 480b is shorter than the opposing edge of the assembly, 0.5 ohm resistors were inserted in line with bus bars 480a and 480b to vary the current and provide a generally uniform power density.

TABLE I

| | | | Anodic Bus Bars | | | Cathodic Bus Bars | | | | % LTA | % LTA |
|---|---|---|---|---|---|---|---|---|---|---|---|
| Ex. | Volts | Amps | 460a | 460b | 460c | 480a | 480b | 480c | 480d | top | bottom |
| 1 | 0.70 | 0.092 | (+) | (+) | (+) | (−) | (−) | (−) | (−) | <1 | 2 |
| 2 | 0.70 | 0.065 | (+) | (+) | Off | (−) | Off | (−) | Off | <1 | 6–7 |

TABLE I-continued

|  |  |  | Anodic Bus Bars | | | Cathodic Bus Bars | | | | % LTA | % LTA |
|---|---|---|---|---|---|---|---|---|---|---|---|
| Ex. | Volts | Amps | 460a | 460b | 460c | 480a | 480b | 480c | 480d | top | bottom |
| 3 | 0.70 | 0.154 | (+) | (+) | Short | (−) | Short | (−) | Short | 14 | 54 |
| 4 | 0.80 | 0.187 | (+) | (+) | Short | (−) | Short | (−) | Short | 3 | 54 |

In Example 1, current was applied to all of the anodic and cathodic bus bars at 0.70 volts, and therefore, to the entire electrochromic window assembly 410 with electrical potential evenly distributed throughout the entire assembly. After 5 minutes, the electrochromic window assembly achieved a constant or steady state at 0.092 amps, in which all of the oxidation/reduction reaction had occurred between the anodic and cathodic dye within the electrochromic medium. As can be seen in Table I, the entire electrochromic window assembly achieved an excellent coloring, with the top portion of the window assembly having and LTA of <1%, and the bottom portion of the assembly having an LTA of approximately 2%. Thus, the coloring or darkening of the window assembly was achieved quickly and uniformly.

In Example 2, current was applied to only the anodic and cathodic bus bars arranged at the top of the window assembly 410, specifically anodic bus bar 460a and 460b, and cathodic bus bars 480a and 480c, at 0.70 volts. After 5 minutes, the electrochromic window assembly achieved a constant or steady state at 0.065 amps, in which all of the oxidation/reduction reaction had occurred between the anodic and cathodic dye within the electrochromic medium. As can be seen in Table I, the top portion of the electrochromic window assembly achieved an excellent coloring, having an LTA of <1%. The bottom portion of the assembly had an LTA of approximately 6–7%. Thus, the coloring or darkening of the window assembly was non-uniform and had a gradient as viewed from the top to the bottom portion.

In Example 3, current was applied to only the anodic and cathodic bus bars arranged at the top of the window assembly 410, specifically anodic bus bar 460a and 460b and cathodic bus bars 480a and 480c, at 0.70 volts. Further, current to the remaining anodic and cathodic bus bars, namely anodic bus bar 460c and cathodic bus bars 480b and 480d was shorted, i.e. any current reaching these bus bars from the energized bus bars through the conductive coatings was removed. After 5 minutes, the electrochromic window assembly achieved a constant or steady state at 0.154 amps, in which all of the oxidation/reduction reaction had occurred between the anodic and cathodic dye within the electrochromic medium. As can be seen in Table I, the top portion of the electrochromic window assembly achieved partial coloring, having an LTA of 14%. The bottom portion of the assembly had an LTA of approximately 54%, representing no color change and full transmission through the bottom portion of the assembly. Thus, a partial shade band was achieved across the top of the window assembly, with a small amount of light transmitted through the shade band.

In Example 4, current was applied to only the anodic and cathodic bus bars arranged at the top of the window assembly 410, specifically anodic bus bar 460a and 460b and cathodic bus bars 480a and 480c, as with Example 3, but instead at 0.80 volts. Again, as with Example 3, current to the remaining anodic and cathodic bus bars, namely anodic bus bar 460c and cathodic bus bars 480b and 480d was shorted. After 5 minutes, the electrochromic window assembly achieved a constant or steady state at 0.187 amps, in which all of the oxidation/reduction reaction had occurred between the anodic and cathodic dye within the electrochromic medium. As can be seen in Table I, the top portion of the electrochromic window assembly achieved excellent coloring, having an LTA of approximately 3%. The bottom portion of the assembly, on the other hand, had an LTA of approximately 54%, representing no color change and full transmission through the bottom portion of the assembly. Thus, a complete shade band was achieved across the top of the window assembly.

Example embodiments of the present invention have now been described. It will be appreciated that these examples are merely illustrative of the invention. Many variations and modifications of the invention will be apparent to those skilled in the art are intended to be included within the scope of the following claims.

What is claimed is:

1. An electrochromic window assembly comprising:
    a first transparent substrate including a first conductive coating on a surface thereof;
    a second transparent substrate including a second conductive coating on a surface thereof, said first transparent substrate and said second transparent substrate being spaced from each other to define a chamber therebetween;
    an electrochromic medium contained in said chamber, said electrochromic medium having a luminous transmittance that varies upon application of an electrical potential through said electrochromic medium;
    a plurality of first spaced facilities contacting said first conductive coating and capable of delivering electrical current to said first conductive coating;
    a plurality of second spaced facilities contacting said second conductive coating and capable of delivering electrical current to said second conductive coating to establish said electrical potential through said electrochromic medium;
    a first plurality of connectors, each one of the first plurality of connectors being individually and separately connected to at least a corresponding one of the plurality of first spaced facilities to deliver electrical current to the at least corresponding one of the plurality of first spaced facilities; and
    a second plurality of connectors, each one of the second plurality of connectors being individually and separately connected to at least a corresponding one of the plurality of second spaced facilities to deliver electrical current to the at least corresponding one of the plurality of second spaced facilities.

2. The window assembly of claim 1, wherein said plurality of first spaced facilities and said plurality of second spaced facilities are bus bars.

3. The window assembly of claim 1, wherein at least one of said plurality of first spaced facilities and at least one of said plurality of second spaced facilities are positioned about a perimeter of said window assembly.

4. The window assembly of claim 3, wherein said plurality of first spaced facilities and said plurality of second spaced facilities are arranged about said perimeter.

5. The window assembly of claim 4, wherein said plurality of first spaced facilities are arranged between said plurality of second spaced facilities about said perimeter.

6. The window assembly of claim 1, wherein said first transparent substrate and said second transparent substrate have a non-symmetric geometry.

7. The window assembly of claim 1, wherein said plurality of first spaced facilities contact said first conductive coating along opposing ends thereof, and said plurality of second spaced facilities contact said second conductive coating along opposing ends thereof, said opposing ends of said first conductive coating and said opposing edges of said second conductive coating being spaced from each other.

8. The window assembly of claim 7, wherein at least one of said opposing edges of said first conductive coating is in at least close proximity to said perimeter of said widow assembly.

9. The window assembly of claim 8, wherein said opposing ends of said first conductive coating and said opposing ends of said second conductive coating are in at least close proximity to said perimeter of said widow assembly.

10. The window assembly of claim 1, wherein each of said plurality of first spaced facilities are equal in size and each of said plurality of second spaced facilities are equal in size.

11. The window assembly of claim 1, wherein at least one of said plurality of first spaced facilities is of a different length than another of said plurality of first spaced facilities.

12. The window assembly of claim 1, wherein each of said plurality of first spaced facilities and said plurality of second spaced facilities is at least 0.5 inches in length.

13. The window assembly of claim 1, wherein said plurality of first spaced facilities are spaced apart at least 0.5 inches, and said plurality of second spaced facilities are spaced apart at least 0.5 inches.

14. The window assembly of claim 11, wherein each of said plurality of first spaced facilities is spaced from each of said plurality of second spaced facilities about said perimeter at a distance of at least 0.5 inches.

15. The window assembly of claim 1, further comprising resistors positioned to adjust said electrical current delivered to at least one of said plurality of first spaced facilities.

16. The window assembly of claim 1, further comprising a controller capable of controlling delivery of said electrical current to selected ones of said plurality of first spaced facilities and selected ones of said plurality of second spaced facilities, such that said luminous transmittance through a first portion of said electrochromic medium is different from said luminous transmittance through a second portion of said electrochromic medium.

17. The window assembly of claim 16, wherein said controller is capable of shorting said electrical current at other selected ones of said plurality of first spaced facilities and at other selected ones of said plurality second spaced facilities.

18. The window assembly of claim 1, wherein said electrochromic medium comprises at least one anodic electrochromic compound and at least one cathodic electrochromic compound, wherein application of electrical potential to said electrochromic medium causes simultaneous oxidation of said anodic electrochromic compound and reduction of said cathodic electrochromic compound, thereby causing reduced luminous transmittance.

19. The window assembly of claim 1, wherein the electrochromic medium is self-erasing.

20. The window assembly of claim 1, where in said first and second transparent substrates are selected from glass, polymeric materials and combinations thereof.

21. The window assembly of claim 1, wherein said electrochromic window assembly is selected from automotive windshields, automotive side windows, automotive sunroofs, architectural glazings, and aircraft windows.

22. The window assembly of claim 1, wherein said first and said second conductive coatings have a sheet resistance ranging from 1 ohm per square to 10 ohms per square.

23. The window assembly of claim 1, wherein said first and said second conductive coatings have a thickness ranging from 5,000 Å to 50,000 Å.

24. The window assembly of claim 1, wherein said electrical current is applied to said first and said second conductive coatings in the range of 0.5 volts to 1.0 volt.

25. The window assembly of claim 1, wherein said luminous transmittance of at least a portion of said assembly varies from a minimum LTA ranging from 1 to 20 percent and a maximum LTA ranging from 60 to 80 percent.

* * * * *